United States Patent
Kumano et al.

(10) Patent No.: US 9,530,063 B2
(45) Date of Patent: Dec. 27, 2016

(54) LANE-LINE RECOGNITION APPARATUS INCLUDING A MASKING AREA SETTER TO SET A MASKING AREA AHEAD OF A VEHICLE IN AN IMAGE CAPTURED BY AN IMAGE CAPTURE UNIT

(71) Applicant: DENSO CORPORATION, Kariya, Aichi-pref. (JP)

(72) Inventors: Syunya Kumano, Gothenburg (SE); Naoki Kawasaki, Kariya (JP); Shunsuke Suzuki, Aichi-ken (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 49 days.

(21) Appl. No.: 14/621,812

(22) Filed: Feb. 13, 2015

(65) Prior Publication Data
US 2015/0235091 A1 Aug. 20, 2015

(30) Foreign Application Priority Data
Feb. 14, 2014 (JP) ................................. 2014-026594

(51) Int. Cl.
*G08B 21/00* (2006.01)
*G06K 9/00* (2006.01)

(52) U.S. Cl.
CPC ................................. *G06K 9/00798* (2013.01)

(58) Field of Classification Search
CPC ............ G06K 9/00798; G06K 9/00805; G06K 9/6202; G06K 9/6292
USPC ........................................................ 340/435
See application file for complete search history.

(56) References Cited

U.S. PATENT DOCUMENTS

| 5,555,312 A * | 9/1996 | Shima ....................... B60R 1/00 340/937 |
| 2006/0239509 A1 | 10/2006 | Saito |
| 2013/0027511 A1* | 1/2013 | Takemura .......... G06K 9/00805 348/42 |
| 2014/0009615 A1* | 1/2014 | Kiyohara ................. H04N 7/18 348/148 |
| 2015/0161457 A1* | 6/2015 | Hayakawa ............. G08G 1/166 348/46 |

FOREIGN PATENT DOCUMENTS

| JP | 2006-140636 | 6/2006 |
| JP | 2006-331389 | 12/2006 |

* cited by examiner

*Primary Examiner* — Mark Rushing
(74) *Attorney, Agent, or Firm* — Harness, Dickey & Pierce, P.L.C.

(57) ABSTRACT

An apparatus for recognizing a lane line. In the apparatus, when a three-dimensional object lies in the same lane as a subject vehicle and a distance between the three-dimensional object and the subject vehicle is small in an image acquired by an image capture unit, a masking area setter sets a masking area that is partially truncated at or near a lower end of the three-dimensional object in the image. A degree-of-belief calculator is configured to, for each of the edge points extracted by the edge-point extractor, calculate a degree of belief that the edge point is on the lane line. The degree of belief when the edge point is in the masking area is set less than the degree of belief when the edge point is outside the masking area. A lane-line recognizer is configured to recognize the lane line based on the degrees of belief calculated for the edge points.

4 Claims, 8 Drawing Sheets

LANE-LINE RECOGNITION APPARATUS INCLUDING A MASKING AREA SETTER TO SET A MASKING AREA AHEAD OF A VEHICLE IN AN IMAGE CAPTURED BY AN IMAGE CAPTURE UNIT

CROSS-REFERENCE TO RELATED APPLICATION

This application is based on and claims the benefit of priority from earlier Japanese Patent Applications No. 2014-26594 filed Feb. 14, 2014, the descriptions of which are incorporated herein by reference.

BACKGROUND

Technical Field

The present invention relates to a lane-line recognition apparatus.

Related Art

A known technique is configured to extract edge points in an image ahead of a subject vehicle captured by a vehicle-mounted camera and recognize a lane line based on the extracted edge points. In the presence of a three-dimensional object, such as a preceding vehicle, ahead of the subject vehicle, such a technique may detect not only the edge points of the lane line, but also edge points of the three-dimensional object, which may prevent lane-line recognition.

Another technique, as disclosed Japanese Patent Application Laid-Open Publication No. 2006-331389, is configured to mask an area of the image, in which a preceding vehicle lies, to thereby exclude the edge points within the masked area, and recognize a lane line on the basis of the remaining edge points.

With such a technique, however, many of the edge points of the lane line may be masked with an excessively large mask depending on the position of the preceding vehicle or a distance from the subject vehicle to the preceding vehicle. In such a case, it becomes difficult to accurately recognize the lane line.

In consideration of the foregoing, exemplary embodiments of the present invention are directed to providing a lane-line recognition apparatus for accurately recognizing a lane line.

SUMMARY

In accordance with an exemplary embodiment of the present invention, there is provided an apparatus for recognizing a lane line, including: an edge-point extractor configured to extract edge points in the image of surroundings of a subject vehicle (that is a vehicle mounting the apparatus) including a roadway ahead of the subject vehicle, the image being acquired by an image capture unit; a three-dimensional object detector configured to detect a three-dimensional object ahead of the subject vehicle; a masking area setter configured to set a masking area corresponding to the three-dimensional object detected by the three-dimensional object detector in the image acquired by the image capture unit; a degree-of-belief calculator configured to, for each of the edge points extracted by the edge-point extractor, calculate a degree of belief that the edge point is on the lane line, the degree of belief when the edge point is in the masking area being set less than the degree of belief when the edge point is outside the masking area; and a lane-line recognizer configured to recognize the lane line using the edge points selected based on the degrees of belief calculated for the edge points extracted by the edge-point extractor.

When a three-dimensional object is detected, the lane-line recognition apparatus configured as above sets, in the image, a masking area corresponding to the three-dimensional object. A degree of belief for each of the edge points present in the masking area is set lower than a degree of belief for each of the edge points present outside the masking area. The edge points present in the masking area may originate not from the lane line, but from the three-dimensional object. Accordingly, recognition of the lane line using the edge points in the masking area would lead to inaccurate recognition. That is, the edge points in the masking area have a lower degree of belief than the edge points present outside the masking area, which can reduce the above negative effect.

The masking area setter is further configured to, when all three prescribed conditions are met, set a masking area that is partially truncated at or near a lower end of the three-dimensional object in the image as compared with a masking area (default mask) set when not all of the conditions are met.

The three prescribed conditions include a first condition (J1) that the three-dimensional object lies in the same lane as the subject vehicle, a second condition (J2) that a width of the three-dimensional object is equal to or greater than a predetermined value, and a third condition (J3) that a distance between the three-dimensional object and the subject vehicle is equal to or less than a predetermined value.

That is, when all the three prescribed conditions (J1)-(J3) are met, the three-dimensional object (such as a preceding vehicle) lies in the same lane as the subject vehicle and a distance between the three-dimensional object and the subject vehicle is small.

If a masking area extending to the lower end of the three-dimensional object is set, a portion of the lane line at and near the lower end of the three-dimensional object will be covered by the masking area (i.e., a mask), which may reduce edge points that can be used to recognize the lane line. The lane-line recognition apparatus configured as above sets a masking area that does not cover the portion of the lane line at and near the lower end of the three-dimensional object when all the conditions (J1)-(J3) are met, which can reduce the above negative effect.

DESCRIPTION OF SPECIFIC EMBODIMENTS

With reference to the accompanying drawings, hereinafter are specifically described several embodiments of the present invention.

First Embodiment

1. Lane-Line Recognition Apparatus

Figure 1A:
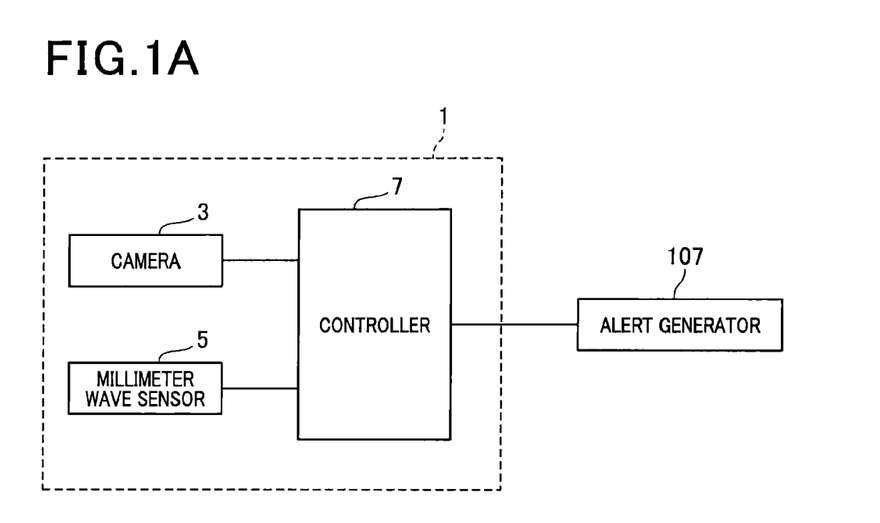
FIG. 1A is a block diagram of a lane-line recognition apparatus in accordance with a first embodiment of the present invention.
Figure 1B:
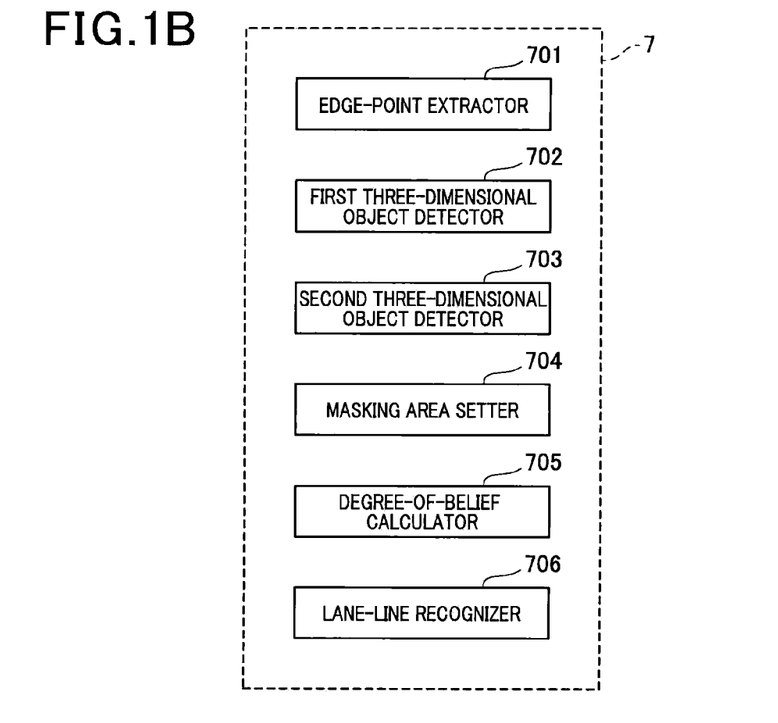
FIG. 1B is a functional block diagram of a controller of the lane-line recognition apparatus.

A lane-line recognition apparatus 1 in accordance with a first embodiment of the present invention will now be explained with reference to FIGS. 1A, 1B, and 2. The lane-line recognition apparatus 1 is mounted in a vehicle (hereinafter referred to as a subject vehicle) and configured to recognize lane lines, such as white lines, broken lines and the like). The lane-line recognition apparatus 1, as shown in FIG. 1A, includes a camera 3 (as an image capture unit), a millimeter wave sensor 5, and a controller 7 (as an apparatus for recognizing a lane line).

Figure 2:
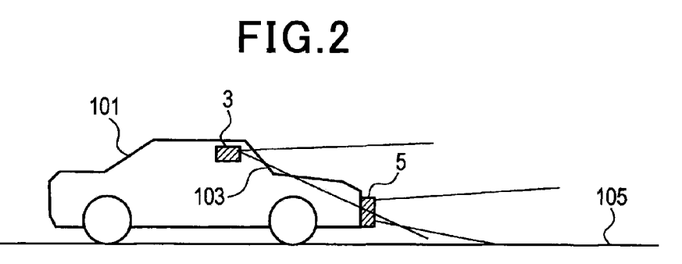
FIG. 2 is a side view of arrangement of a vehicle-mounted and a millimeter wave sensor.

As shown in FIG. 2, the camera 3 is disposed proximate a top end of a front windshield 103 and inside a passenger compartment of the subject vehicle 101. The camera 3 is configured to capture images of the surroundings including a roadway 105 ahead of the subject vehicle 101 and output data of the captured images to the controller 7.

As shown in FIG. 2, the millimeter wave sensor 5 is installed on the front end of the subject vehicle 101 and may be an FM-CW millimeter-wave radar. The millimeter wave sensor 5 transmits and receives frequency-modulated radar waves of the millimeter wave band to detect the presence of a reflective three-dimensional object and determine a direction and a distance from the subject vehicle to the object. A coverage of the millimeter wave sensor 5 may include a roadway 105 ahead of the subject vehicle 101. The millimeter wave sensor 5 outputs signals indicative of detection results to the controller 7.

The controller 7 is a well-known microcomputer including Central Processing Unit (CPU), Read Only Memory (ROM), Random Access Memory (RAM) and others, and is configured to execute processes described later using the images captured by the camera 3 and the detection results of the millimeter wave sensor 5 and thereby recognize lane lines. The controller 7 is configured to output information about the recognized lane lines to an alert generator 107.

The alert generator 107 is a device mounted in the subject vehicle 101 and configured to execute various processes using the information about the recognized lane lines received from the lane-line recognition apparatus 1. For example, the alert generator 107 is configured to determine the presence or absence of a risk of the subject vehicle 101 deviating from a lane line based on a distance from the subject vehicle 101 to the lane line, an angle between a longitudinal direction of the lane line and a travel direction of the subject vehicle 101, a speed of the subject vehicle 101 and others. When it is determined that there is a risk of the subject vehicle 101 deviating from a lane line, the alert generator 107 alerts a driver of the subject vehicle 101 via voice outputs, image display or the like, or performs automatic steering to prevent deviation of the subject vehicle 101 from the lane line.

The camera 3 serves as an image capture unit. The controller 7, as shown in FIG. 1B, includes an edge-point extractor 701, a first three-dimensional object detector 702, a second a three-dimensional object detector 703, a masking area setter 704, a degree-of-belief calculator 705, and a lane-line recognizer 706, which are described later. The camera 3 is used by the first three-dimensional object detector 702, and the millimeter wave sensor 5 is used by the second three-dimensional object detector 703. These functional blocks 701-706 are implemented by the CPU executing computer programs respectively corresponding to these functional blocks 501-505 stored in the ROM or the like.

One having skill in the art will appreciate that the various programs can reside in memory on a system other than the depicted microcomputer (controller). The programs may comprise or may be included in one or more code sections containing instructions for performing their respective operations. While the programs are described as being implemented as software, the present implementation may be implemented as a combination of hardware and software or hardware alone.

2. Lane-Line Recognition Process

Figure 3:
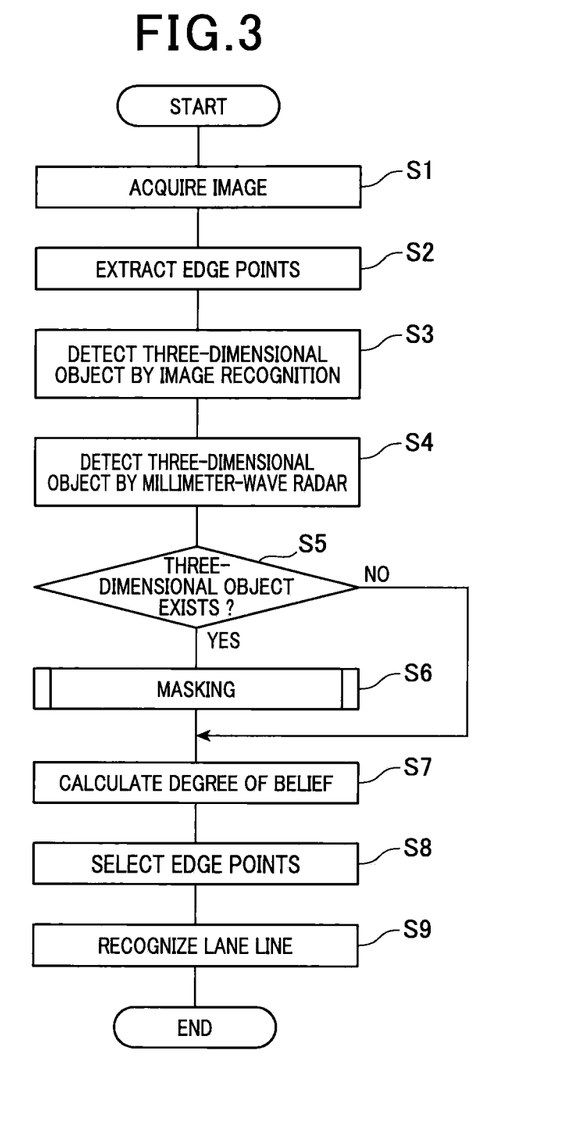
FIG. 3 is a flowchart of a lane-line recognition process performed in the lane-line recognition apparatus.

A lane-line recognition process performed in the lane-line recognition apparatus 1 will now be explained with reference to FIGS. 3-7. The process shown in a flowchart of FIG. 3 is performed repeatedly every predetermined time interval. In step S1, as shown in FIG. 3, the lane-line recognition apparatus 1 uses the camera 3 to acquire images of the surroundings including the roadway ahead of the subject vehicle 101.

In step S2, the controller 7 uses a differentiation filter for each horizontal line formed of a plurality of pixels (along which all the pixels take the same vertical coordinate value) in the image acquired in step S1 to calculate derived values. That is, for each horizontal line, a rate of change in luminance value is calculated for each pair of adjacent pixels along the horizontal line. Thereafter, for each derived value, it is determined whether or not the derived value is equal to or greater than a predetermined threshold. If it is determined that the derived value is equal to or greater than the predetermined threshold, then it can be considered that the luminance value significantly changes between the adjacent pixels of the pair corresponding to the derived value, and coordinate values of the pixels of the pair corresponding to the derived value are registered as an edge point 107A. This operation is repeated for all the pairs of adjacent pixels included in the image.

In step S3, the controller 7 detects a three-dimensional object ahead of the subject vehicle in the image acquired in step S1. That is, a rear profile of a pre-registered three-dimensional object is detected in the image acquired in step S1 via well-known image recognition processing.

The three-dimensional object refers to an object which lies on the roadway and has a height from the roadway surface, such as a vehicle (other than the subject vehicle), a bicycle, a pedestrian, a street sign, a barrier, an overhead pedestrian walkway, a traffic light, a barricade or the like.

In step S4, the controller 7 uses the millimeter wave sensor 5 to detect a three-dimensional object ahead of the subject vehicle.

In step S5, the controller 7 determines whether or not a three-dimensional object has been detected in step S3 or S4. If it is determined that a three-dimensional object has been detected, then the process proceeds to step S6. Otherwise, the process proceeds to step S7.

In step S6, the controller 7 sets a masking area (hereinafter referred to as a mask), of the image acquired in step S1, corresponding to the three-dimensional object detected in step S5. Setting of the mask (or masking) is described later.

In step S7, the controller 7 calculates, for each of the edge points extracted in step S2, a degree of belief (likelihood) that the edge point is on a lane line. More specifically, a degree of belief is a product of item values calculated for a plurality of items. The plurality of items and criteria for calculating the item values are as follows.

(Item 1) Whether or not the edge point is in the mask set in step S6. If the edge point is in the mask, then the item value is small. If the edge point is outside the mask, then the item value is greater than the item value for the edge point in the mask.

(Item 2) Whether or not a distance between the edge point and the last recognized lane line is large. The item value decreases with increasing distance.

(Item 3) Whether or not the edge point lies on a straight line or on a curve close to a straight. If the edge point lies on a straight line or on a curve close to a straight line, then the item value is large. Otherwise, the item value is small.

The degree of belief that the edge point is on a lane line is a product of all the item values.

In step S8, the controller 7 selects, among all the edge points extracted in step S2, edge points having a degree of belief equal to or greater than a predetermined threshold.

In step S9, the controller 7 uses the edge points selected in step S8 to recognize the lane line. More specifically, the edge points selected in step S8 are Hough transformed, and a line passing through a maximum number of edge points is recognized as a lane line. The edge points that are not selected in step S8, that is, the edge points having a degree of belief less than the predetermined threshold, are not used in the lane line recognition.

In the controller 7 (see FIG. 1B), the edge-point extractor 701 is responsible for execution of the operation in step S2, the first three-dimensional object detector 702 is responsible for execution of the operation in step S3, the second three-dimensional object detector 703 is responsible for execution of the operation in step S4, the masking area setter 704 is responsible for execution of the operation in step S6, the degree-of-belief calculator 705 is responsible for execution of the operation in step S7, and the lane-line recognizer 706 is responsible for execution of the operations in steps S8, S9.

The mask setting (or masking) process in step S6 will now be explained with reference to a flowchart of FIG. 4 under assumption that, in step S3 or S4, n three-dimensional objects have been detected with n being a positive integer. In practice, the same object may be detected not only by applying the image recognition processing to the image, but also by using the millimeter wave sensor 5. Even in such cases, an object detected in step S3 and an object detected in step S4 are assigned distinct numbers even though these objects are the same object.

Figure 4:
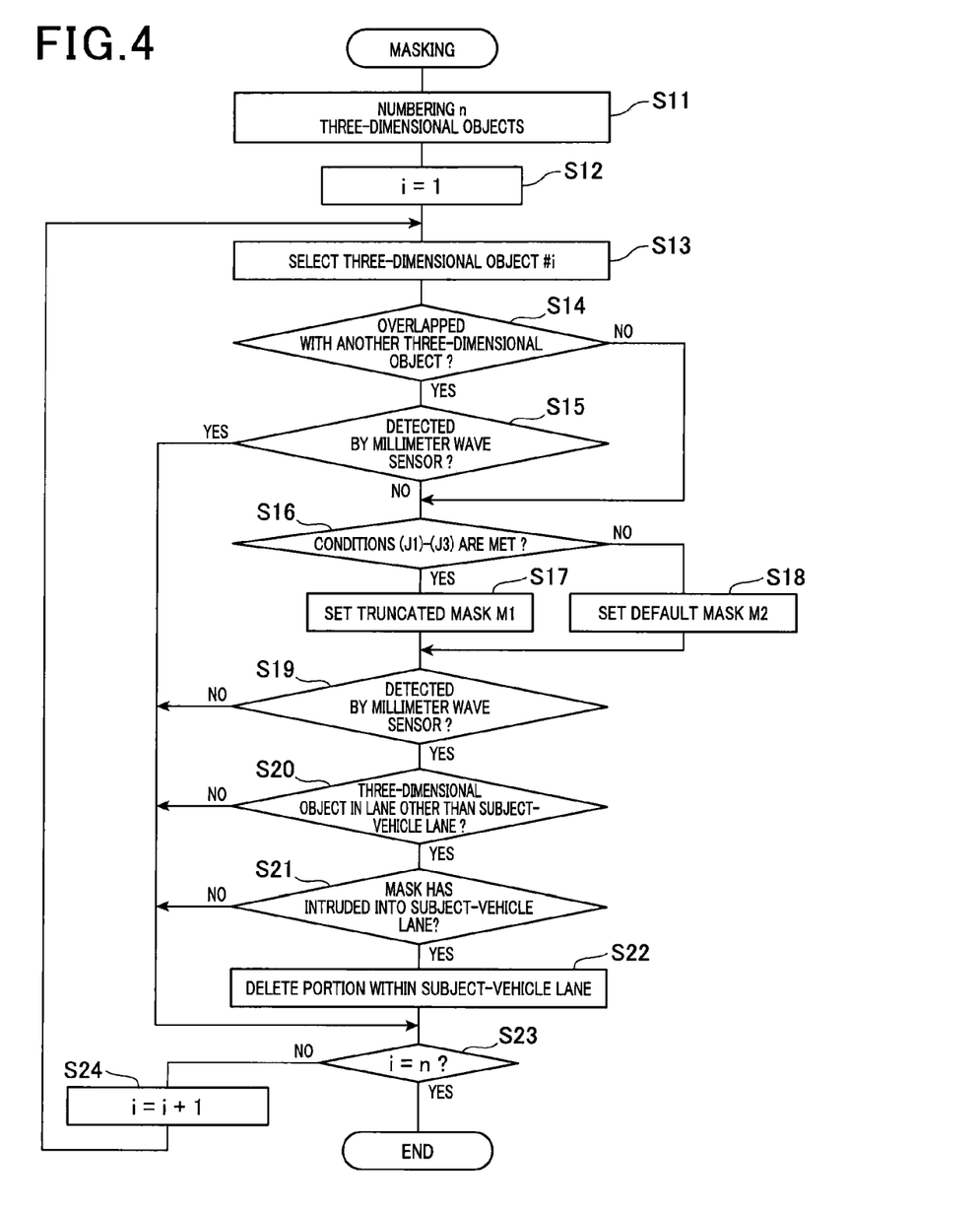
FIG. 4 is a flowchart of a masking process performed in the lane-line recognition apparatus.

In step S11 of FIG. 4, n three-dimensional objects are assigned numbers 1, 2, 3, . . . , n, respectively. In step S12, i is set to 1 as an initial value.

In step 13, the controller 7 selects a three-dimensional object #i (i being a positive integer such that 1≤i≤n) among the three-dimensional objects #1-#n. In step S13 immediately after step S12, i=1. In step S13 immediately after step S24, i takes a value set in step S24.

Figure 5A:
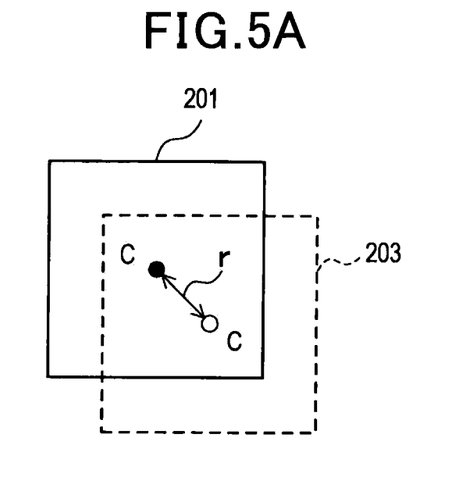
FIG. 5A is an example scene where a distance between a subject three-dimensional object and another three-dimensional object is less than a predetermined value.
Figure 5B:
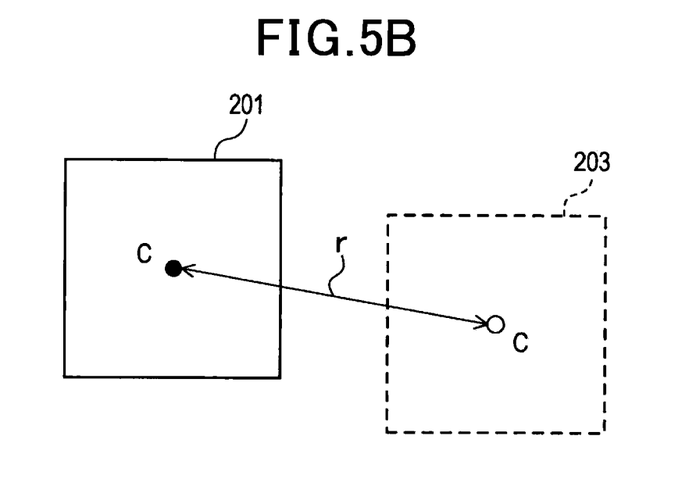
FIG. 5B is an example scene where a distance between a subject three-dimensional object and another three-dimensional object is greater than a predetermined value.

In step S14, the controller 7 determines whether or not a distance r between the three-dimensional object #i and another three-dimensional object than the three-dimensional object #i is equal to or less than a predetermined value. For example, as shown in FIG. 5A, if it is determined whether or not a three-dimensional object 203 other than the three-dimensional object #1 exists with the distance r between the three-dimensional object #1 and the other three-dimensional object equal to or less than the predetermined value, then the process proceeds to step S15. If it is determined that, as shown in FIG. 5B, a distance r between the three-dimensional object #i and another three-dimensional object than the three-dimensional object #i is greater than the predetermined value, then the process proceeds to step S16. A distance between three-dimensional objects may be defined as a distance between the center positions C of the three-dimensional objects.

A distance between the three-dimensional object #i and another three-dimensional object can be determined by detecting three-dimensional positions of these three-dimensional objects relative to the subject vehicle and then calculating a distance between these positions.

In the image recognition processing, a position of a three-dimensional object may be calculated based on a position of the object in the image and dimensions of the object in the image. The position of the three-dimensional object detected by the image recognition processing may be determined by using the millimeter wave sensor 5. For example, a distance between the three-dimensional object detected by the image recognition processing and the subject vehicle may be calculated by using the millimeter wave sensor 5.

The position of the three-dimensional object detected by the millimeter wave sensor 5 may be calculated based on an amount of time from emission of a millimeter wave to receipt of the reflected millimeter wave and a direction of the reflected millimeter wave (a direction from the subject vehicle to the three-dimensional object).

In step 15, it is determined whether or not the three-dimensional object #i is a three-dimensional object detected by the millimeter wave sensor 5. If the three-dimensional object #i is a three-dimensional object detected by the millimeter wave sensor 5, then the process proceeds to step S23 without setting a mask. Otherwise, the process proceeds to step S16.

In step 16, it is determined whether nor not the three-dimensional object #1 satisfies all the following conditions (J1)-(J3).

Figure 6A:
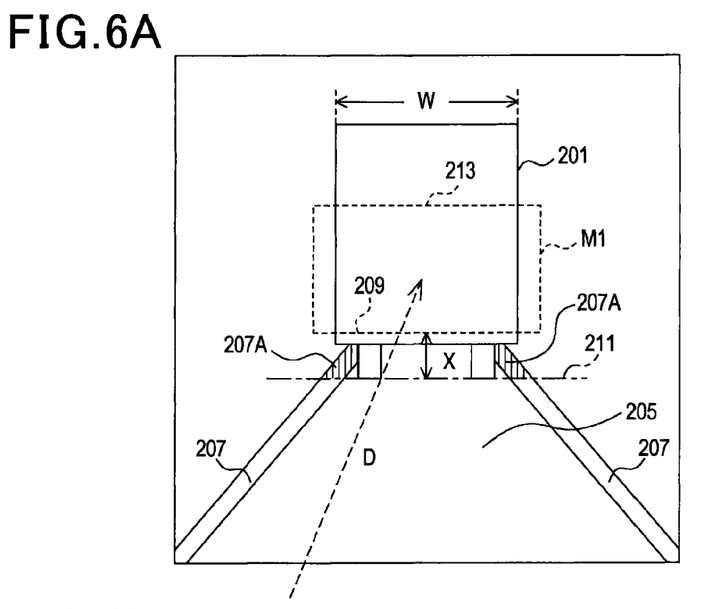
FIG. 6A is a schematic of setting a truncated mask.

(J1): as shown in FIG. 6A, the three-dimensional object 201 (#i) lies in the same lane 205 as the subject vehicle 205.

(J2): as shown in FIG. 6A, a width W of the three-dimensional object 201 (#i) is equal to or greater than a predetermined value.

(J3): as shown in FIG. 6A, a distance D between the three-dimensional object 201 (#i) and the subject vehicle is equal to or less than a predetermined value.

If all the conditions (J1)-(J3) are met, then the process proceeds to step S17. If at least one of the conditions (J1)-(J3) is not met, the process proceeds to step S18.

Figure 6B:
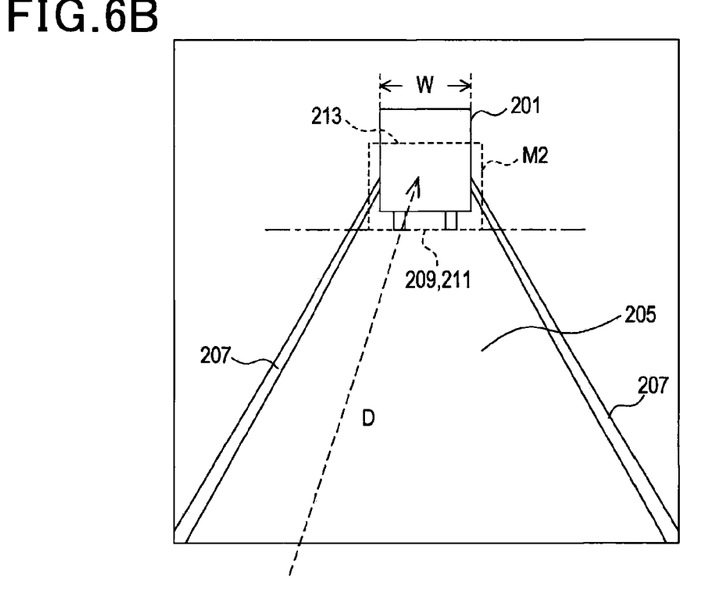
FIG. 6B is a schematic of setting a default mask.

In a scenario as shown in FIG. 6B, a distance D between the three-dimensional object #i and the subject vehicle is greater than the predetermined value, and thus the condition (J3) is not met. In the condition (J1), the lane 205 is an area between the previously recognized lane lines 207. In the condition (J2), the width W of the three-dimensional object 201 can be calculated based on an apparent width of the three-dimensional object 201 in the image and the distance D between the three-dimensional object 201 and the subject vehicle. A width W (e.g. approximately 1 m) may be set which is less than the width of another vehicle but greater than three-dimensional objects other than vehicles. The distance D may be calculated based the position of the three-dimensional object 201.

In step S17, the controller 7 sets a mask M1 that covers an area, of the image acquired in step S1, corresponding to the three-dimensional object #i. As shown in FIG. 6A, the mask M1 horizontally covers the three-dimensional object 201 (#i). A lowermost end 209 of the mask M1 is a predetermined distance (or height) X above a lowermost end 211 of the three-dimensional object 201 (#i). That is, a portion of the area corresponding to the three-dimensional object #i of the predetermined height X from the lowermost end 211 of the three-dimensional object 201 (#i) is not covered by the mask M1. An uppermost end 213 of the mask M1 is positioned above a forward point at infinity as viewed from the subject vehicle. The mask M1 is smaller than a default mask M2 (described later) by a lower end portion of the mask M2 of the predetermined height X from the lowermost end 211 of the three-dimensional object 201 (#i).

In step S18, the controller 7 sets a mask M2 that covers an area, of the image acquired in step S1, corresponding to the three-dimensional object #i. As shown in FIG. 6B, the mask M2 also horizontally covers the three-dimensional object 201 (#i). A lowermost end 209 of the mask M2 coincides with the lowermost end 211 of the three-dimensional object 201 (#i). That is, the lower end portion of the three-dimensional object 201 (#i) is completely covered by the mask M2. An uppermost end 213 of the mask M2 is positioned above the forward point at infinity as viewed from the subject vehicle.

In step S19, the controller 7 determines whether nor not the three-dimensional object 201 (#i) is a three-dimensional object detected by the millimeter wave sensor 5. If it is determined that the three-dimensional object 201 (#i) is a three-dimensional object detected by the millimeter wave sensor 5, then the process proceeds to step S20. Otherwise, if the three-dimensional object 201 (#i) is a three-dimensional object detected by image recognition processing, and then the process proceeds to step S23.

Figure 7:
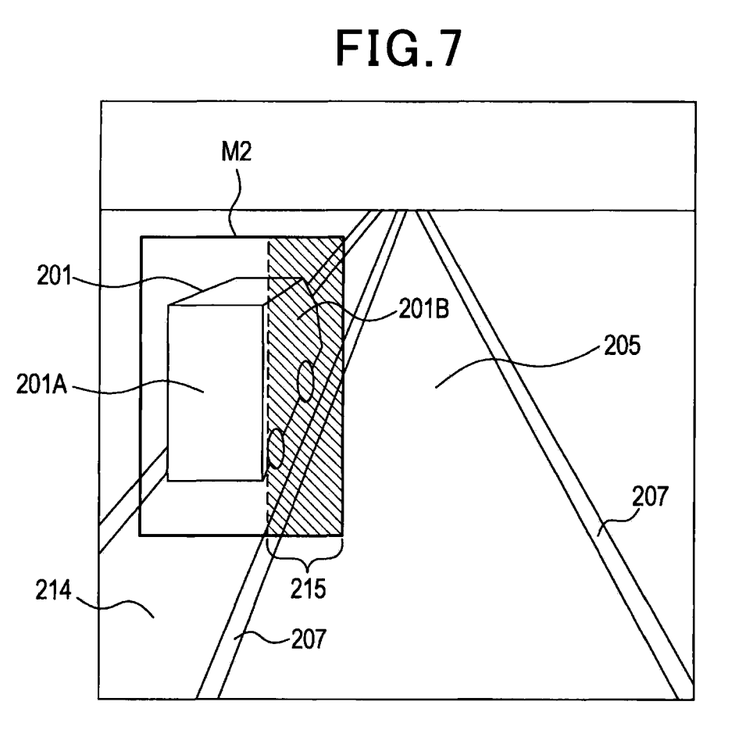
FIG. 7 is a schematic of deleting a portion of a mask when the mask has intruded into a subject-vehicle lane.

In step S20, as shown in FIG. 7, the controller 7 determines whether or not the three-dimensional object 201 (#i) lies in another lane 214 than the lane 205 of the subject vehicle, for example, in a lane 214 adjacent the lane 205 of the subject vehicle. If the three-dimensional object 201 (#i) lies in another lane 214 than the lane 205 of the subject vehicle, then the process proceeds to step S21. If the three-dimensional object 201 (#i) lies in the same lane 205 as the subject vehicle, then the process proceeds to step S23.

In step S21, the controller 7 determines whether or not, as shown in FIG. 7, at least a portion of the mask M2 set in step S18 has intruded into the lane 205 of the subject vehicle. If it is determined that at least a portion of the mask M2 has intruded into the lane 205 of the subject vehicle, then the process proceeds to step S22. Otherwise, the process proceeds to step S23.

In step S22, the controller 7 deletes the portion 215 of the mask M2 that has intruded into the lane 205 of the subject vehicle, as shown in FIG. 7. After the deletion, the lane 205 of the subject vehicle becomes uncovered by the mask M2.

In step S23, the controller 7 determines whether or not i has reached n, that is, whether or not the mask setting (masking) has been performed for all the three-dimensional objects. If it is determined that i has reached n, then the process ends. Otherwise, the process proceeds to step S24, where i is incremented by one. Thereafter, the process proceeds to step S13.

3. Advantages (1) The lane-line recognition apparatus 1 is configured to, when a three-dimensional object is detected, set a mask (or masking area) to cover at least a portion of the three-dimensional object. A degree of belief for each of the edge points present in the mask (i.e., a degree of belief that the edge point is on a lane line) is set lower than a degree of belief for each of the edge points present outside the mask. The edge points present in the mask may originate not from the lane line, but from the three-dimensional object. Accordingly, recognition of the lane line using the edge points in the mask would lead to inaccurate recognition. In the present embodiment, the edge points in the mask have a lower degree of belief than the edge points outside the mask, which can reduce the above negative effect.

The lane-line recognition apparatus 1 is configured to, when the conditions (J1)-(J3) are met, that is, when a three-dimensional object (such as a preceding vehicle) having a large width and a small distance to the subject vehicle lie in the same lane as the subject vehicle, sets the mask M1 to cover the three-dimensional object. In such a case, a large portion of the lane line of the lane of the subject vehicle is shadowed by the three-dimensional object.

If a mask extending to the lower end 211 of the three-dimensional object 201 is set, a portion 207A of the lane line at and near the lower end 211 of the three-dimensional object 201 (see FIG. 6A) will be covered by the mask, which removes more edge points that could otherwise have been used to recognize the lane line 207. The lane-line recognition apparatus 1 is configured to, when all the conditions (J1)-(J3) are met, sets the mask M1 that does not cover the portion 207A of the lane line at and near the lower end 211 of the three-dimensional object 201, which can reduce the above negative effect.

(2) The lane-line recognition apparatus 1 can detect a three-dimensional object not only by performing the image recognition processing, but also by using the millimeter wave sensor 5. The lane-line recognition apparatus 1 is configured to, when a distance between a three-dimensional object detected by performing the image recognition processing and a three-dimensional object detected by using the millimeter wave sensor 5 is equal to or less than a predetermined value (that is, when the same three-dimensional object is double detected by both the image recognition processing and the millimeter wave sensor 5), set a mask to cover at least a portion of the three-dimensional object detected by performing the image recognition processing and set no mask for the three-dimensional object detected by using the millimeter wave sensor 5 (see steps S14-S15).

With this configuration, a direction and dimensions of the three-dimensional object can be accurately detected, which leads to accurate setting of the mask.

(3) The lane-line recognition apparatus 1 is configured to, when a three-dimensional object lying in a lane other than the lane 205 of the subject vehicle is detected by using the millimeter wave sensor 5, limit the mask M2 to the outside the lane 205 the subject vehicle (see steps S19-S22).

When a three-dimensional object present in a lane other than the lane 205 of the subject vehicle is detected by the millimeter wave sensor 5, a side 201B of the three-dimensional object 201 may not be distinguished from a rear 201A of the three-dimensional object 201, and a mask M2 may be set to cover both the rear 201A and the side surface 201B, as shown in FIG. 7. In such a case, a portion of the mask M2 that covers the side 201B of the three-dimensional object 201 may intrude into the lane 205 of the subject vehicle and cover a portion of the lane line 207 of the lane 205 of the subject vehicle.

As above, the lane-line recognition apparatus 1 is configured to, when a three-dimensional object present in a lane other than the lane 205 of the subject vehicle is detected by the millimeter wave sensor 5, limit the mask M2 to outside the lane 205 of the subject vehicle to thereby prevent the mask M2, particularly a portion of the mask M2 covering the side 201B of the three-dimensional object 201, from covering a portion of the lane line 207 of the lane 205 of the subject vehicle.

OTHER EMBODIMENTS (1) In some alternative embodiments, the lane-line recognition apparatus 1 may be configured to exclude edge points in the mask and use the edge points outside the mask to recognize the lane line.

Figure 8A:
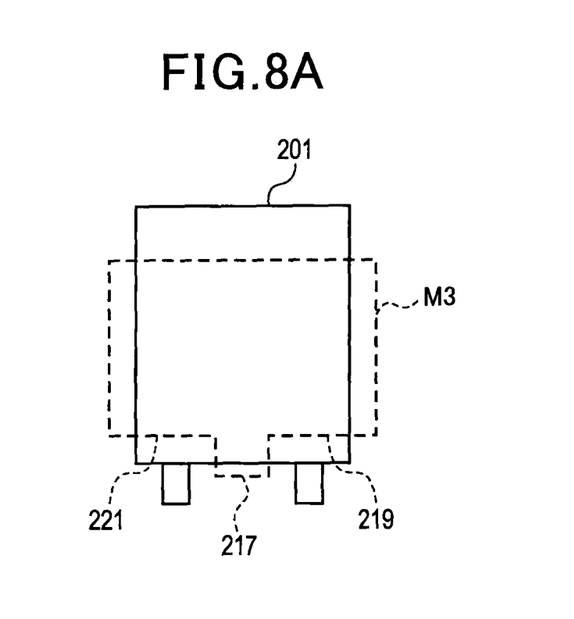
FIGS. 8A-8B are alternative embodiments.

(2) The shape, dimensions, and the position of the mask M1 are not limited to those of the first embodiment, but may be varied. For example, as shown in FIG. 8A, the mask M1 may be modified in shape such that bottom left and right ends 221, 219 are above a bottom center 217. The bottom center 217 may be positioned above or below or at the lower end 211 of the three-dimensional object 201. Such a shape of the modified mask M3 also allows portions 207A of the lane lines 207 at or near the lower end 211 (see FIG. 6A) to be exposed.

Figure 8B:
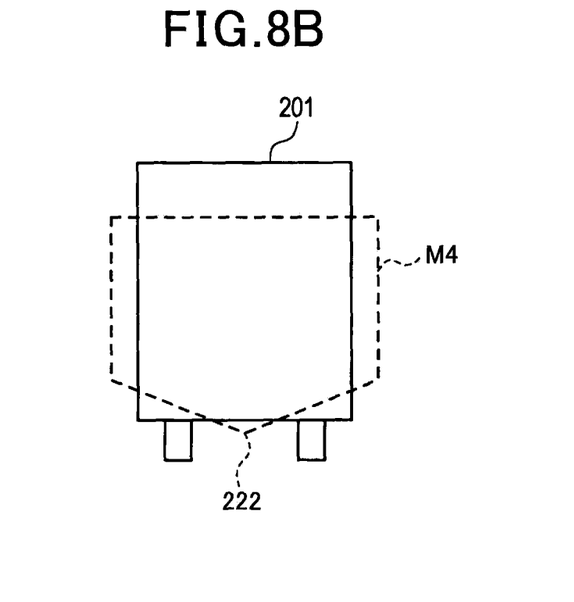

Alternatively, as shown in FIG. 8B, the mask M1 may be modified in shape such that bottom right and left ends are defined to angle upward in directions extending from the bottom center 222 toward the left and right sides. The bottom center 222 may be positioned above or below or at the lower end 211 of the three-dimensional object 201. Such a shape of the modified mask M4 also allows portions 207A of the lane lines 207 at or near the lower end 211 (see FIG. 6A) to be exposed.

The shape, dimensions, and the position of the mask M2 are not limited to those of the first embodiment, but may be varied. For example, the mask M2 may be modified in shape such that the lower end 209 is positioned above or below the lower end 211 of the three-dimensional object 201. Alternatively, the mask M2 may be similarly modified in shape as shown in FIGS. 8A and 8B.

(3) In some alternative embodiments, a three-dimensional object may be detected by other means (such as a radar sensor using waves other than millimeter waves).

(4) In some alternative embodiments, the lane-line recognition apparatus 1 may be configured to detect a three-dimensional object either by the image recognition processing or by the millimeter wave sensor 5.

(5) In some alternative embodiments, masks may be set not to all the three-dimensional objects, but to some of the three-dimensional objects.

What is claimed is:

1. An apparatus for recognizing a lane line, comprising:
   an edge-point extractor configured to extract edge points in an image of surroundings of a subject vehicle including a roadway ahead of the subject vehicle, the image being acquired by an image capture unit;
   a three-dimensional object detector configured to detect a three-dimensional object ahead of the subject vehicle;
   a masking area setter configured to set a masking area corresponding to the three-dimensional object detected by the three-dimensional object detector in the image captured by the image capture unit, the masking area setter being configured to, when all of a number of prescribed conditions are met, set a masking area that is partially truncated at or near a lower end of the three-dimensional object in the image as compared with a masking area set when not all of the prescribed conditions are met, the prescribed conditions including a first condition (J1) that the three-dimensional object lies in the same lane as the subject vehicle, a second condition (J2) that a width of the three-dimensional object is equal to or greater than a predetermined value, and a third condition (J3) that a distance between the three-dimensional object and the subject vehicle is equal to or less than a predetermined value;
   a degree-of-belief calculator configured to, for each of the edge points extracted by the edge-point extractor, calculate a degree of belief that the edge point is on the lane line, the degree of belief when the edge point is in the masking area being set less than the degree of belief when the edge point is outside the masking area; and
   a lane-line recognizer configured to recognize the lane line using the edge points selected based on the degrees of belief calculated for the edge points extracted by the edge-point extractor.

2. The apparatus of claim 1, wherein the three-dimensional object detector comprises:
   a first three-dimensional object detector configured to detect a three-dimensional object by applying image recognition processing to the image acquired by the image capture unit; and
   a second three-dimensional object detector configured to detect a three-dimensional object by using a millimeter wave sensor,
   wherein the masking area setter is configured to, when a distance between the three-dimensional object detected by the first three-dimensional object detector and the three-dimensional object detected by the second three-dimensional object detector is equal to or less than a predetermined value, set the masking area corresponding to the three-dimensional object detected by the first three-dimensional object detector in the image acquired by the image capture unit.

3. The apparatus of claim 2, wherein the masking area setter is further configured to, when a three-dimensional object present in a lane other than the lane of the subject vehicle is detected by the second three-dimensional object detector, limit the masking area corresponding to the three-dimensional object in the image acquired by the image capture unit to outside the lane of the subject vehicle.

4. The apparatus of claim 1, wherein the lane-line recognizer is further configured to recognize the lane line based on the edge points outside the masking area set by the masking area setter.

* * * * *